Feb. 12, 1952   D. K. GANNETT   2,585,545
SIGNALING SYSTEM

Original Filed May 1, 1946   2 SHEETS—SHEET 1

INVENTOR
D. K. GANNETT
BY
ATTORNEY

Feb. 12, 1952     D. K. GANNETT     2,585,545
SIGNALING SYSTEM

Original Filed May 1, 1946     2 SHEETS—SHEET 2

INVENTOR
D. K. GANNETT
BY
*H. A. Burgess*
ATTORNEY

Patented Feb. 12, 1952

2,585,545

UNITED STATES PATENT OFFICE 2,585,545

SIGNALING SYSTEM

Danforth K. Gannett, Mountain Lakes, N. J., assignor to Bell Telephone Laboratories, Incorporated, New York, N. Y., a corporation of New York Original application May 1, 1946, Serial No. 666,281. Divided and this application November 9, 1948, Serial No. 59,058

9 Claims. (Cl. 171—97)

This application is a division of my application, Serial No. 666,281 filed May 1, 1946.

The present invention relates to a pulse producing system including saturable core coils as the pulse generating means, such coils being energized from a source of voltage waves.

The object of the invention is to produce pulses of definite frequency by means of a plurality of pulse coils operated in timed sequence by a common source of driving voltage.

An incidental object is to provide a frequency step-down by unusual ratios determined by the number of coils used.

A feature of the invention comprises novel types of ring circuits and the manner of controlling them to produce pulses.

The nature and objects of the invention and the manner of applying the invention in practice will be made clear from the following description of an illustrative embodiment shown in the accompanying drawings in which.

Figure 1:
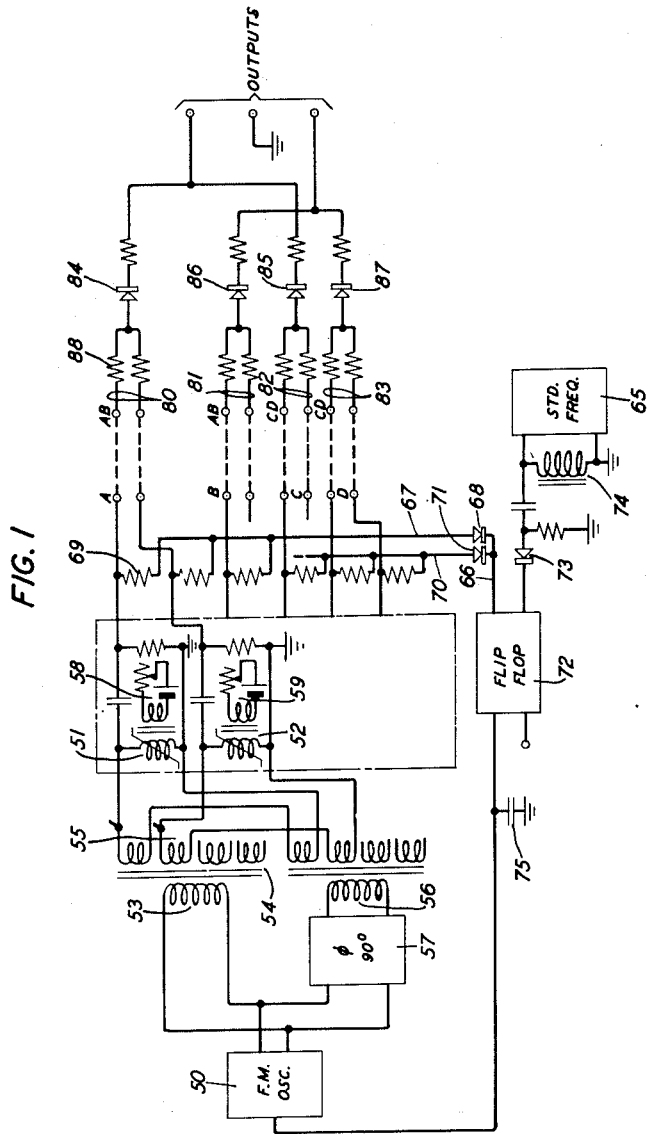
Fig. 1 is a schematic circuit diagram showing a ring circuit in accordance with the invention.

In Fig. 1 there is shown an impulse coil type of ring circuit having any desired number of stages, the number being arbitrarily assumed as seventeen for purposes of illustration. On this assumption there are seventeen impulse coils, two of which are indicated at 51 and 52. In other words, there would be one impulse coil per ring circuit stage. These coils are driven from a source of alternating current in the form of a frequency modulated oscillator 50 generating current of a frequency equal to 30,000 cycles per second, for example, divided by the number of ring stages, in this case seventeen. The different phases of current for driving the individual impulse coils are derived from a so-called Scott transformer consisting of two parts. The first part comprises primary winding 53, core 54 and a number of secondary windings 55. The second group comprises primary winding 56 and a corresponding number of associated secondary windings. A 90-degree phase shifter 57 is included ahead of winding 56. The secondary windings are connected in pairs in a series relation, each pair consisting of one winding from each transformer secondary group with the number of turns in each winding chosen to give the desired phase.

The impulse coils 51, 52, etc., and their manner of operation may follow the disclosure of Wrathall Patent 2,117,752, May 17, 1938. As the magnetic circuit of the coil at some part of the driving wave, generally near zero, passes rapidly from negative to positive saturation, the flux reversal generates a sharp voltage pulse. A pulse of opposite polarity is generated a half-cycle later but this is discarded at a later point in the circuit. The points at which the positive pulses occur in the different coils are distributed uniformly around 360 electrical degrees.

This could be done by using seventeen (in this case) pairs of phase windings on the Scott transformer, one pair for each of the seventeen impulse coils and distributing the phases of these windings uniformly around 360 electrical degrees. The unwanted negative pulses produced by the impulse coils could then be suppressed by a properly poled rectifier in each of the seventeen output circuits. An economy in apparatus can be effected, however, by producing only four phases and by using individual biases on the impulse coils to determine the point in the respective phase at which the unsaturated region is reached. For example, if the four phases are called A, B, C and D, four of the impulse coils 51, 52, etc., may be driven from phase A, four from phase B, four from phase C and five from phase D, in the case of a seventeen-stage ring. A diagram has been included in Fig. 2 to show how the biases may be chosen in the case of a thirty-one-stage ring circuit. In this case, eight coils are connected to each of phases A, B and C and seven coils to phase D. Biasing circuits are indicated in Fig. 1 at 58 and 59 in the form of a second winding through which may be passed an adjustable amount of current from a battery or other suitable source.

Figure 2:
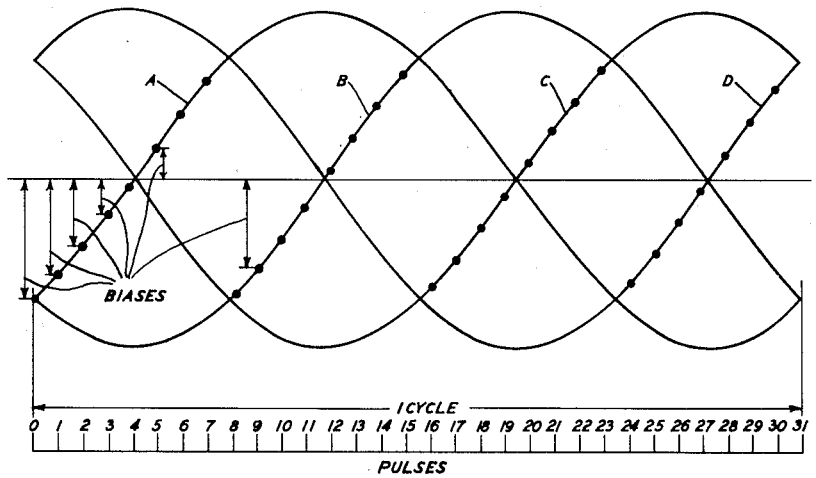
Fig. 2 shows graphs illustrative of the timing that may be used in the circuit of Fig. 1.

As indicated in Fig. 2 the rising part of each phase voltage wave is chosen over a substantially linear portion for driving the respective group of coils. The individual biases are stepped so that only one coil reaches its unsaturated region at a time. A more nearly linear driving wave may be obtained by means of the circuit illustrated in Fig. 3 which may be substituted, if desired, for the Scott transformer circuit of Fig. 1.

Figure 3:
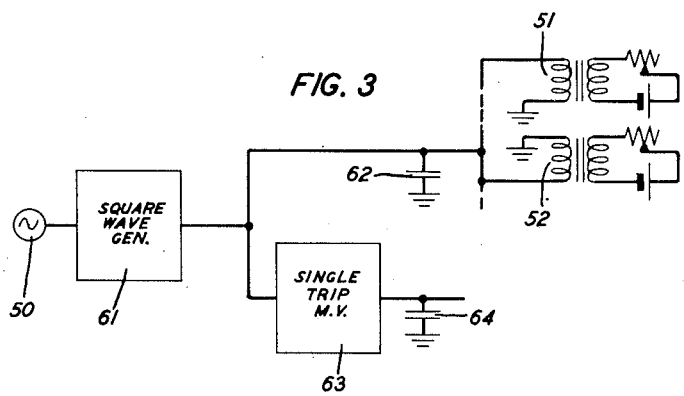
Fig. 3 is a partial schematic circuit diagram of a wave shaping circuit that may be used with the circuit of Fig. 1.
Figure 3A:
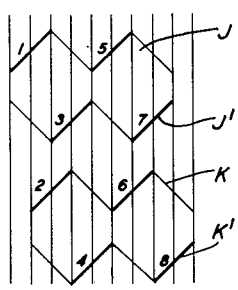
Fig. 3A shows graphs relative to the operation of the circuit of Fig. 3.

In Fig. 3 the output wave from oscillator 50 is passed through a square wave generator 61, the output of which is shunted by a condenser 62. This arrangement will generate a substantially triangular wave of the type shown in J in Fig. 3A and the bias points may be chosen along the linear portions 1 and 5 for certain of the coils. By use of a single trip multivibrator 63 and condenser 64, also connected to the output of square wave generator 61, a similar triangular wave K is developed displaced 90 degrees in phase with respect to the wave J. The bias points may be chosen along the rising linear portions 2 and 6 of the wave K. The wave J may be reversed in phase and applied to others of the impulse coils as shown at J'. The rising linear portions 3 and 7 of this wave may be used. Similarly, wave K can be reversed in phase to give wave K' and the ascending portions 4 and 8 of this wave may be used for driving the coils. Coil 52 of Fig. 3 illustrates one case in which the phase of the driving wave is reversed with respect to that used on coil 51.

Referring further to Fig. 2, it will be apparent that the time at which a voltage wave reaches and passes through the unsaturated portion of the characteristic is determined by the magnitude of the bias used for the particular coil and, as noted above, the various values of bias are indicated by the displacements of the dots in the vertical direction from the zero axis of the waves.

One feature of the invention comprises a frequency controlling circuit for maintaining the frequency of the driving oscillator at the correct value to produce the 30,000-cycle pulses. This circuit is shown in detail in connection with the upper ring circuit of Fig. 1 and involves a comparison circuit between the output of a pulse producing circuit comprising impulse coil 74 driven from a standard frequency oscillator 65, and a circuit 66 carrying the pulses produced in all of the coils of the given ring circuit. It will be noted that the circuit 66 has two branches, one branch 67 being connected through a rectifier element 68 by way of high resistances 69 to the various output circuits of the coils belonging to the A and B phases and the other branch 70 being similarly connected to all of the output circuits of the coils associated with the C and D phases and also including a rectifier 71. Positive pulses only are therefore selected and impressed on the circuit 66 leading to one side of a flip-flop circuit 72. The opposite input terminal of the flip-flop circuit 72 is connected to the standard frequency pulse producing circuit through a rectifier 73 which also selects only the positive pulses generated in the impulse coil 74 and occurring at the standard frequency of 30,000 per second.

The flip-flop circuit 72 is of the well-known Eccles-Jordan type comprising a pair of vacuum tubes which operate in complementary fashion to produce output pulses of square wave form having a length proportional to the difference in time between the application times of the input pulses to the opposite input terminals. The resulting direct current is integrated in the condenser 75 and applied to the frequency-modulated oscillator 53.

With proper adjustment this circuit automatically maintains the frequency of the oscillator 50 at the correct value to result in the production of output impulses from the ring circuit at 30,000 impulses per second. The adjustment is such that normally the pulses in the output of the flip-flop circuit 72 are about the same length as the intervening spaces. Under these conditions if the frequency of the pulses from the ring circuit varies, the time of occurrence of these pulses relative to those from the standard frequency oscillator 65 also varies such that the output pulses from circuit 72 increase in length if the output pulses from the ring circuit occur too early and decrease in length if they occur too late. Corresponding variations occur in the integrated direct current applied to the frequency-modulated oscillator in such direction as to tend to restore the pulses to the right time relationship. The frequency-modulated oscillator circuit 53 may be of any suitable type, such as an oscillator provided with a reactance tube as the frequency controlling element, as in De Lange Patent 2,278,063, issued March 31, 1942, for example.

Reference to Fig. 2 will show that positive pulses are produced in substantially succeeding quarter-cycles of the phases A, B, C and D which means that the negative pulses produced, for example, in a descending quarter phase of phase A will overlap or occur at the same time as the positive pulses produced in the rising quarter-phase of phase C, but that as far as the pair of phases A and B are concerned neither produces negative pulses at the same time that the other is producing positive pulses. This is also true of the pair of phases C and D. It is for this reason that circuit 67 in the frequency control circuit can be connected to phases A and B and that a separate circuit 70 needs to be connected to phases C and D.

Just as conductor 66 supplies a continuous series of positive (or like polarity) pulses to the frequency control circuit, this or a similar conductor could be used to supply the same impulses to any desired type of utilization circuit.

Since it may, however, be desired for some purposes to use only some of the generated pulses while dropping out others, illustrative load-connecting circuits are shown which permit flexibility in the manner of supplying pulses to the final output.

Terminal groups 80 and 81 are provided for variously patching to individual coils in the A and B phases. Terminal groups 82 and 83 are provided for variously patching to individual coils in the C and D phases. Individual resistors 88 are connected to the terminals in all groups for enabling the voltages to be supplied in common to the group rectifiers 84, 85, 86 and 87. These act similarly to the rectifiers 68 and 71 to suppress negative pulses and allow positive pulses to be applied through voltage adding resistors to output terminals. The latter may be connected in suitable manner, one way being indicated for supplying different pulses to the two sides of a balanced circuit with respect to ground. Various modifications of these output connections will occur to those skilled in the art.

What is claimed is:

1. Means to produce successions of short sharp pulses of current comprising a circuit including a plurality of saturable core inductance coils, a voltage wave source connected to said coils of sufficient voltage swing to carry said coils through their unsaturated region and well into their saturated region, in both positive and negative directions, in each cycle of said voltage wave whereby said coils produce sharp pulses in said circuit as the unsaturated region is passed through, and a different steady bias applied to each coil of a value to determine a different phase position in said voltage wave at which the respective coil produces such pulse.

2. The combination recited in claim 1 including a multiphase source of voltage waves, certain of said coils being connected to one phase of said source and others of said coils being connected to a different phase of said source, the values of said biases applied to the coils connected to each phase being graduated to cause a succession of timed pulses to be produced during one phase by certain coils and another succession of pulses to be produced during another phase by others of said coils.

3. A ring circuit for producing timed, including equally timed, pulses in endless succession comprising a four-phase voltage wave source, two groups of saturable core inductance coils, means for applying a different two-phase voltage from said source to each group of coils, said voltage being of sufficient amplitude to drive said coils through and well beyond their saturation region in both positive and negative directions in each voltage cycle, each group of coils having graduated individual steady biases of such value as to determine definite timing of the produced pulses, and a common output circuit for the pulses from all of said coils.

4. A circuit according to claim 3 including one-way conducting devices between each group of coils, and said common output circuit for limiting the pulses impressed upon said output circuit to the pulses having the desired polarity.

5. An impulse coil ring circuit comprising N impulse coils, where N is any plural integral number, a source of driving voltage waves having a frequency $$\frac{F}{N}$$

where F is the frequency of the pulses to be produced in pulses per second, said source being a four-phase source with two successive phases connected to one group of said coils and the other two phases connected to the rest of the coils, the amplitude of said driving voltage being sufficient to sweep said coils through and beyond their unsaturated region in both positive and negative directions whereby a pulse is generated in each coil when the coil reaches its unsaturated region, each coil being provided with a steady bias of such value as to determine the time of occurrence of the pulse produced by it relative to the phase of said driving wave, and a load circuit connected to said coils to receive said pulses.

6. The combination recited in claim 5 including a frequency control circuit for maintaining constant the frequency of said pulses comprising a constant frequency source of pulses of frequency F, a differential detecting circuit, means to impress thereon said constant frequency pulses and also the pulses generated by said coils, said detecting circuit including means to produce a unidirectional current of value dependent upon the phase and frequency agreement between said pulses from said coils and said constant frequency pulses, and a frequency correcting circuit for said source of driving voltage waves controlled in accordance with variations in said unidirectional current.

7. A ring circuit comprising a plurality of impulse coils having saturable cores, a source of driving voltage common to said coils for sweeping them over their characteristics throughout and beyond their unsaturated region in both directions, said source including means to derive and apply to said coils waves of progressively changing phase from coil to coil whereby a plurality of pulses are produced per cycle of said driving voltage, a source of standard frequency pulses having the same nominal frequency as said pulses produced by said coils, a comparison circuit for comparing the frequency and phase agreement between said standard frequency pulses and the pulses produced by said coils, and means under the control of said comparison circuit for supplying frequency correcting currents to said source of driving voltage to control the frequency thereof.

8. In combination a source of electrical waves of given frequency, a plurality of impulse coils energized by said waves, variable bias means on said coils to cause the respective coils to pass through their unsaturated magnetic regions in succession within a single period of said waves, and means for selecting pulses of like polarity from said impulse coils and suppressing pulses of opposite polarity.

9. The combination recited in claim 8 including also a frequency control circuit including means for detecting variations in the frequency of the produced pulses with reference to a standard frequency and means responsive to the detected variations for producing compensating corrections in the frequency of said wave source.

DANFORTH K. GANNETT.

No references cited.